UNITED STATES PATENT OFFICE.

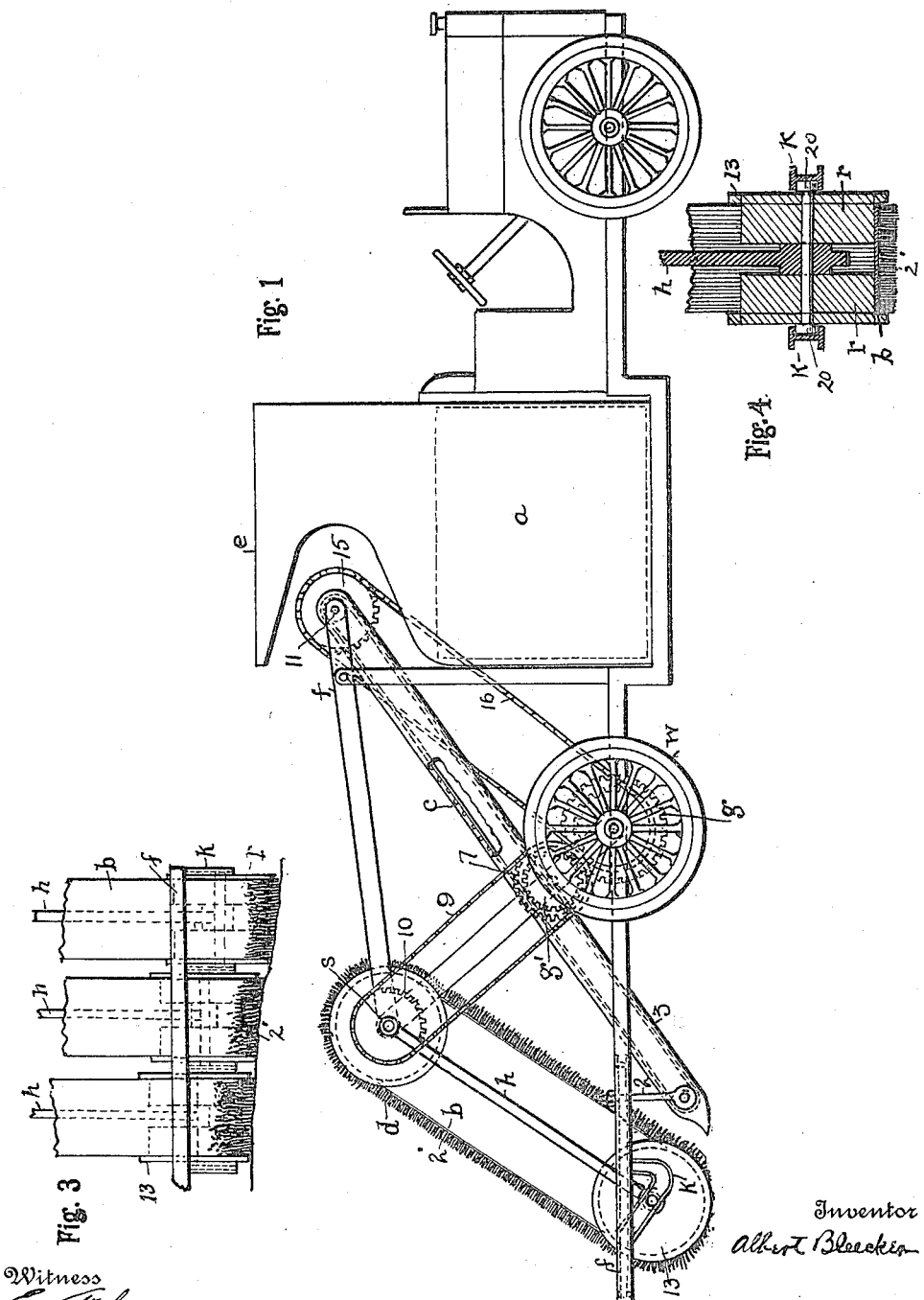

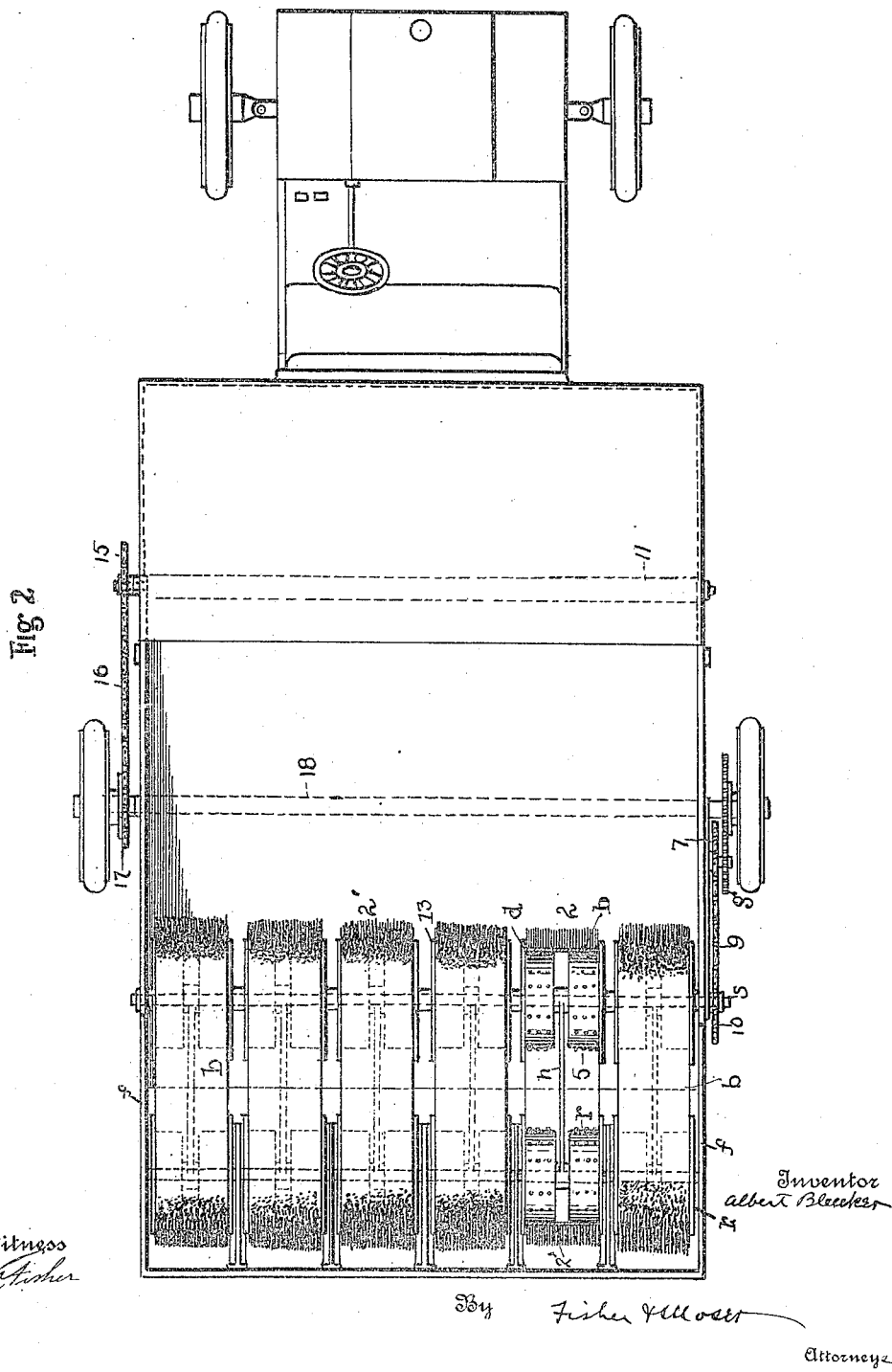

ALBERT BLEECKER, OF AKRON, OHIO.

STREET-SWEEPING MACHINE.

1,306,877.  Specification of Letters Patent.  Patented June 17, 1919.

Application filed October 1, 1917. Serial No. 194,155.

*To all whom it may concern:*

Be it known that I, ALBERT BLEECKER, a subject of Russia, residing at Akron, in the county of Summit and State of Ohio, have invented certain new and useful Improvements in Street-Sweeping Machines, of which the following is a specification.

This invention pertains to a street sweeping machine, constructed and adapted to operate substantially as shown and described and particularly pointed out in the claims.

In the accompanying drawings, Figure 1 is a side elevation of the machine and Fig. 2 is a plan view thereof. Fig. 3 is a rear elevation of a portion of the sweeper mechanism, as hereinafter fully described. Fig. 4 is a section on the axis of one of the several rollers and its supports for the endless sweepers.

The idea herein is to provide a street sweeping machine which will sweep the street clean and deliver the sweepings into a bin or chamber on the machine, and which has sweeping units independently supported in trailing relations at the rear of the machine and in such position that the sweepings therefrom will be delivered to or upon an endless carrier which discharges into the said chamber in the machine.

To these several ends I employ a power driven truck of the automobile type and which is constructed to accommodate the parts otherwise required for my purpose and which in this instance, comprise a chamber or bin $a$ which is built into or upon the truck between the front and rear wheels and adapted to receive the sweepings from the endless carrier $c$. A suitable hood $e$ extends over said chamber above the same and partially over the upper end of the said carrier to more or less confine dust which may arise from the sweepings.

In width the said chamber and carrier correspond substantially to the width of the truck between the sides thereof and the said carrier is supported at its ends on the frame $f$ of the machine and at its rear end is arranged to run comparatively near to the surface of the street so as to receive the sweepings from the endless sweeping belts or sweepers $b$ at the rear thereof and belts 2 from the main frame carry the frame and supports 3 for the said carrier. The said belts are provided with suitable brushes 2' over their entire surface which may be of metal or fiber or other kind which will stand the wear and tear of the hard service to which they are subjected on heavy and rough streets. The said belts are carried over suitable engaging and driving means at their top, such as short drums $d$ having spurs 5 or the like to engage in meshes in said belts, or by equivalent means, so as to give positive actuations to all the belts alike and which in the present construction are constituted of a suitable woven wire fabric in which said spurs will engage and thus drive the belts.

At their lower turns over the surface to be swept the said belts are each supported on an individual roller $r$, which is shown as having a reduced neck at its middle engaged by a hanger $h$ suspended from power driven shaft $s$ at its upper end which carries the drums $d$ fixed thereon, and the said shaft in turn is in power relations by sprocket chain 4 or equivalent means, with the rear carrying wheel W, on which there is a gear $g$ meshing with a gear $g'$ in driving relations with a sprocket wheel 7 and over which runs chain 9 to sprocket wheel 10 on drive shaft $s$.

Each of the said rollers $r$ for belts $b$ is adapted to rotate on or in a suitable bearing at its reduced middle portion in the end of hanger $h$, and said roller has end flanges 13 of a wheel or carrying type and of a depth approximately equal to half the depth of the brushes on the belt, so that if there be any tendency in the brushes to drag over the swept surface it will be mostly offset or overcome by the running contact of the said flanges or wheels with the street and whereby the brushes will be relieved of the downward pressure or weight which would otherwise come upon them  The said flanges are of the nature of disks affixed to the rollers and of greater depth as shown.

As to these features or details I do not care to be arbitrary, as they may be more or less modified and varied and be within my invention. However, I plan always to retain the individuality of the several sweeping belts so as to accommodate the machine to uneven or undulating surfaces, and which may have both high and low places in the same sweeping line at the same time. My construction, therefore, provides for vertical play in the individual rollers and their belts within limits while they all work together in the sweeping operation. Otherwise a flexible connection, or its equivalent, would have to be provided between the ends of said rollers which is not deemed desirable. The individual drums *d* above correspond to the length of the rollers *r* below but actuation is through the said drums which rotate with shaft S on which they are mounted, and the said rollers and their brushes are practically in trailing relations therewith and free to play within limits in up and down relations, more or less as seen in Fig. 3 and in respect to the frame *f* therewith and in the channeled elbow-shaped keepers *k* rigid with said frame and having side channels in which the short spindles on the ends of the rollers have their play. The opposite sides of said keepers *k* being channeled a single keeper between two rollers suffices for both with freedom for each to play up and down.

The sweepings gathered up in advance of the brushes *b* are thrown onto the endless carrier *c* and conveyed thence to the receiving bin or chamber *a*. The said carrier is supported on suitable rollers at or in the ends of the carrier frame 3 and the upper of said rollers 11 is mounted between the sides of frame *f* and has a sprocket wheel 15 in actuating relations therewith and which is power driven by chain 16 engaged over sprocket wheel 17 on the axle 18 of the rear wheels *w* of the machine.

A sweeper constructed as herein is believed to possess the maximum of accommodation to an undulating or uneven street. By making the brushes independent and relatively narrow they accommodate themselves to depressions and bumps or elevations in the road with equal facility and one may draw low and another rise over a bump at the same time and thus sweep an uneven street comparatively clean and which could not be done with a unitary sweeper the full width of the machine, or one that is flexible between its ends. Of course all the independent sweeping units taken together constitute the sweeping medium extending across the full width of the machine but each unit also is to be regarded as complete in itself and can be separately removed and replaced as such unit.

What I claim is:

1. A street sweeping machine comprising a series of endless sweeping belts arranged side by side, a series of rollers on the machine having power connections and a corresponding series of rollers in trailing relation behind the machine carrying said belts, coupling members engaged with the middle of each trailing roller and guides in which said trailing rollers are adapted to rise and fall, and an endless carrier in front of said trailing rollers and belts.

2. A sweeping machine having a bin into which to deposit the sweepings and an endless carrier to deliver the sweepings thereto, in combination with a plurality of sweeping belts behind said carrier laterally side by side in position to brush the sweepings onto said carrier, a separate trailing roller for each of said belts and means to accommodate said rollers independently to the undulations of the surface swept and disks on said rollers at each side of the sweeping belts adapted to run on the surface swept.

3. The machine described having a plurality of sweeping belts laterally side by side, a shaft and a plurality of rollers thereon and a corresponding number of trailing rollers adapted to run over the surface swept and having each a rigid pivotally connected coupling at its middle with said shaft, channeled guides in which the spindles of said trailing rollers are adapted to rotate and rise and fall within limits, and disk shaped rolling supports at the sides of said rollers of less depth than the brushes on said belts.

Signed at Cleveland, in the county of Cuyahoga, and State of Ohio, this 17th day of September, 1917.

ALBERT BLEECKER.